Patented Mar. 18, 1952

2,589,232

UNITED STATES PATENT OFFICE 2,589,232

METHOD OF PREPARING STABILIZED FATTY ACID NITRILES

John Drew, De Ridder, La., and Joe C. Funderburk, Hattiesburg, Miss., assignors to Hercules Powder Company, Wilmington, Del., a corporation of Delaware No Drawing. Application March 14, 1950, Serial No. 149,655

9 Claims. (Cl. 260—465.2)

This invention relates to an improved process for the preparation of fatty acid nitriles by the reaction between fatty acids and ammonia.

The nitriles of the fatty acids have been prepared heretofore by reacting fatty acids with ammonia either in the presence or absence of catalysts. The catalysts which have been employed heretofore have been inorganic catalysts insoluble in the reagents used. Such catalysts have involved a heterogeneous system requiring means for continuously contacting the catalyst with the reagents. Special equipment and apparatus have thus been required and equipment investment costs have accordingly increased with improvements in the processes. A simplified process involving only simple equipment has obvious advantages for the small chemical manufacturer.

Now in accordance with this invention, it has been found that aliphatic nitriles may be prepared by heating a fatty acid having 12 to 18 carbon atoms in the liquid phase with gaseous ammonia in the presence of a catalytic amount of a salt of the fatty acids involved in the reaction and a metal of group II of the periodic table.

The process of this invention is carried out by heating the fatty acids in which is dissolved a catalytic amount of the fatty acid salt of a metal of group II of the periodic table at a temperature within the range of about 250 to about 350° C. while passing ammonia gas through the mixture and removing the water formed.

As an example of this invention, lard fatty acids are melted and a small amount of zinc oxide is added with agitation at about 250° C. until the zinc oxide is completely reacted to form a solution of zinc salts of the fatty acids in the fatty acids. This mixture is then heated in a closed vessel having means for introducing ammonia gas in the lower part of the vessel and having an outlet for gases such as water vapor and ammonia. Ammonia gas is introduced into the mixture at a rate such that the theoretical amount of ammonia is added per hour. The unreacted ammonia containing water vapor is withdrawn, dried by passing through cooling condensers, and is recirculated until the acid number of the charge is reduced to a negligible value close to zero. The aliphatic nitrile is then separated from unreacted acids and zinc salts by distillation. The zinc salts comprising the residue are than re-used, as a source of catalyst, by dissolving them in a subsequent charge of fatty acids.

In Table 1 are given typical data on the preparations of the aliphatic nitriles from commercial stearic acid using a reaction temperature in the range of 300-316° C. All weights are parts by weight. Similar data are obtained with the pure fatty acids such as stearic acid, margaric acid, palmitic acid, oleic acid, myristic acid, and lauric acid or mixtures of these acids. Improved yields of aliphatic nitrile are also obtained using magnesium and beryllium salts of the fatty acids as catalysts. The preferred catalyst is the zinc salt of the fatty acids because it gives consistent results with all of the fatty acids from $C_{12}$ to $C_{18}$, inclusive, and requires less critical control of the temperature and a shorter reaction time. Using the catalysts of this invention, the time of reaction is reduced to one-fifth to one-tenth the time required without a catalyst and the yields are at the same time increased by about 10 to 16%.

Table 1

| Example | I | II | III |
|---|---|---|---|
| Commercial Stearic Acid Weight | 500 | 1,000 | 1,000 |
| Metal Stearate | Zn | Zn | Ca |
| Calculated Weight | 15.6 | 156.0 | 20 |
| Reaction Time (hr.) | 1.0 | 2.5 | 5.0 |
| Crude Nitrile: | | | |
| Weight | 425 | 887 | 910 |
| Nitrogen Analysis | 5.5 | 5.1 | 5.3 |
| Productivity-Lb. Nitrile/Lb. Fatty Acid | 0.887 | 0.858 | 0.905 |

The catalysts of the invention may be prepared in any well-known manner such as by the precipitation method, in which case the precipitated metal salt is added to the fatty acid prior to treatment with ammonia. However, the salts are preferably, for reasons of convenience, prepared in situ by adding the oxide, hydroxide, or lower volatile fatty acid salt of the metal to the melted fatty acid and allowing reaction to take place at temperatures up to about 300° C. with volatilization of water or lower volatile fatty acid, if present, and resultant formation of a homogeneous solution of the fatty acid salt prior to addition of the ammonia. The salt may likewise be formed in situ by reaction between an inorganic salt of the metal and the ammonium salt of the fatty acid. For example, the reaction of ammonium stearate and zinc chloride will form zinc stearate and ammonium chloride with no objectionable side reactions at temperatures below 100° C. Ammonium chloride quickly sublimes at 250–350° C. during the ammoniation period. Traces of water which may aid the reaction result from the formation of traces of nitrile.

The amount of catalyst of this invention which is used should be in the catalytic range, i. e., sufficient should be used to accelerate the reaction. The amount may, for example, be within the range of about 0.1% and 15.0% based upon the amount of fatty acid used. The preferred amount of catalyst is within the range of about 0.1% and about 5% based on the weight of fatty acid used.

The catalysts of the present invention are completely soluble in the fatty acids in the catalytic amounts used at the temperature of reaction. The metal salts thus form a homogeneous system with the fatty acid at reaction temperature and as a result side reactions are at a minimum. The metal salts in this respect differ from the alumina and silica gel catalysts of the prior art which were insoluble in the fatty acid used and formed a heterogeneous mixture of fatty acid and catalyst which was treated with the ammonia.

Although the reaction of the fatty acids with ammonia may be carried out at a temperature of about 250° C. to about 350° C., it is preferably carried out at about 300° C. to about 330° C.

Any means of contacting the fatty acids in liquid phase with ammonia may be used. The use of a sparge tube for introduction of ammonia usually provides for sufficient contact between the ammonia and fatty acid. Since the catalyst is in solution, agitation to promote catalyst dispersions is unnecessary. The amount of ammonia used in the reaction depends upon the efficiency of the ammonia-fatty acid contact. In any event it should be at least the quantity necessary to react completely with the fatty acids present. In the above examples the ammonia sparge rate was adjusted so that roughly every hour sufficient ammonia had passed into the reaction mixture to completely react with the acids present. The reaction may be carried out under pressure or under a slight vacuum. However, it is preferably carried out at atmospheric pressure because of simplified equipment.

Ammonia is passed into the fatty acids in liquid phase until the reaction is essentially complete. Usually it is convenient to add ammonia until the acid number of the reaction mixture is below 5. However, the reaction may be carried out until the amount of unreacted acid is negligible.

The reaction mixture may be distilled in vacuo to give an acid-free product. The reaction mixture may be distilled without neutralization, but in this case, if an acid-free product is desired, it is necessary to carry out the distillation with very careful fractionation.

The fatty acid nitriles prepared in accordance with this invention may be used as insecticides, rubber softeners, oil additives, plasticizers, etc. They are particularly valuable as chemical intermediates for the preparation of amines, amides, amidines, etc.

What we claim and desire to protect by Letters Patent is:

1. The process of preparing an aliphatic nitrile which comprises reacting fatty acids having 12 to 18 carbon atoms in liquid phase with gaseous ammonia in the presence of a salt of said fatty acids and a metal of the group consisting of calcium and zinc.

2. The process of preparing an aliphatic nitrile which comprises reacting fatty acids having 12 to 18 carbon atoms in liquid phase at a temperature of about 250° C. to about 350° C. with gaseous ammonia in the presence of a salt of said fatty acids and a metal of the group consisting of calcium and zinc.

3. The process of preparing an aliphatic nitrile which comprises reacting fatty acids having 12 to 18 carbon atoms in liquid phase at a temperature of about 300° C. to about 330° C. with gaseous ammonia in the presence of a salt of said fatty acids and a metal of the group consisting of calcium and zinc.

4. The process of of preparing an aliphatic nitrile which comprises reacting fatty acids contained in commercial stearic acid in liquid phase at a temperature of about 300° C. to about 330° C. with gaseous ammonia in the presence of a salt of said fatty acids and a metal of the group consisting of calcium and zinc.

5. The process of preparing an aliphatic nitrile which comprises reacting fatty acids contained in commercial stearic acid in liquid phase at a temperature of about 300° C. to about 330° C. with gaseous ammonia in the presence of a zinc salt of said fatty acids.

6. The process of preparing an aliphatic nitrile which comprises reacting stearic acid in liquid phase at a temperature of about 300° C. to about 330° C. with gaseous ammonia in the presence of a salt of stearic acid and a metal of the group consisting of calcium and zinc.

7. The process of preparing an aliphatic nitrile which comprises reacting stearic acid in liquid phase at a temperature of about 300° C. to about 330° C. with gaseous ammonia in the presence of zinc stearate.

8. The process of preparing an aliphatic nitrile which comprises reacting fatty acids contained in commercial stearic acid in liquid phase at a temperature of about 300° C. to about 330° C. with gaseous ammonia in the presence of a calcium salt of said fatty acids.

9. The process of preparing an aliphatic nitrile which comprises reacting stearic acid in liquid phase at a temperature of about 300° C. to about 330° C. with gaseous ammonia in the presence of calcium stearate.

JOHN DREW.
JOE C. FUNDERBURK.

REFERENCES CITED

The following references are of record in the file of this patent:

UNITED STATES PATENTS

| Number | Name | Date |
| --- | --- | --- |
| 2,061,314 | Ralston et al. | Nov. 17, 1936 |
| 2,375,005 | Kung | May 1, 1945 |
| 2,493,637 | Niederhauser | Jan. 3, 1950 |

FOREIGN PATENTS

| Number | Country | Date |
| --- | --- | --- |
| 532,938 | Great Britain | Feb. 4, 1941 |